Jan. 21, 1936.  D. A. WANGELIN  2,028,365
ROTARY HOE
Filed Feb. 3, 1932  3 Sheets-Sheet 2
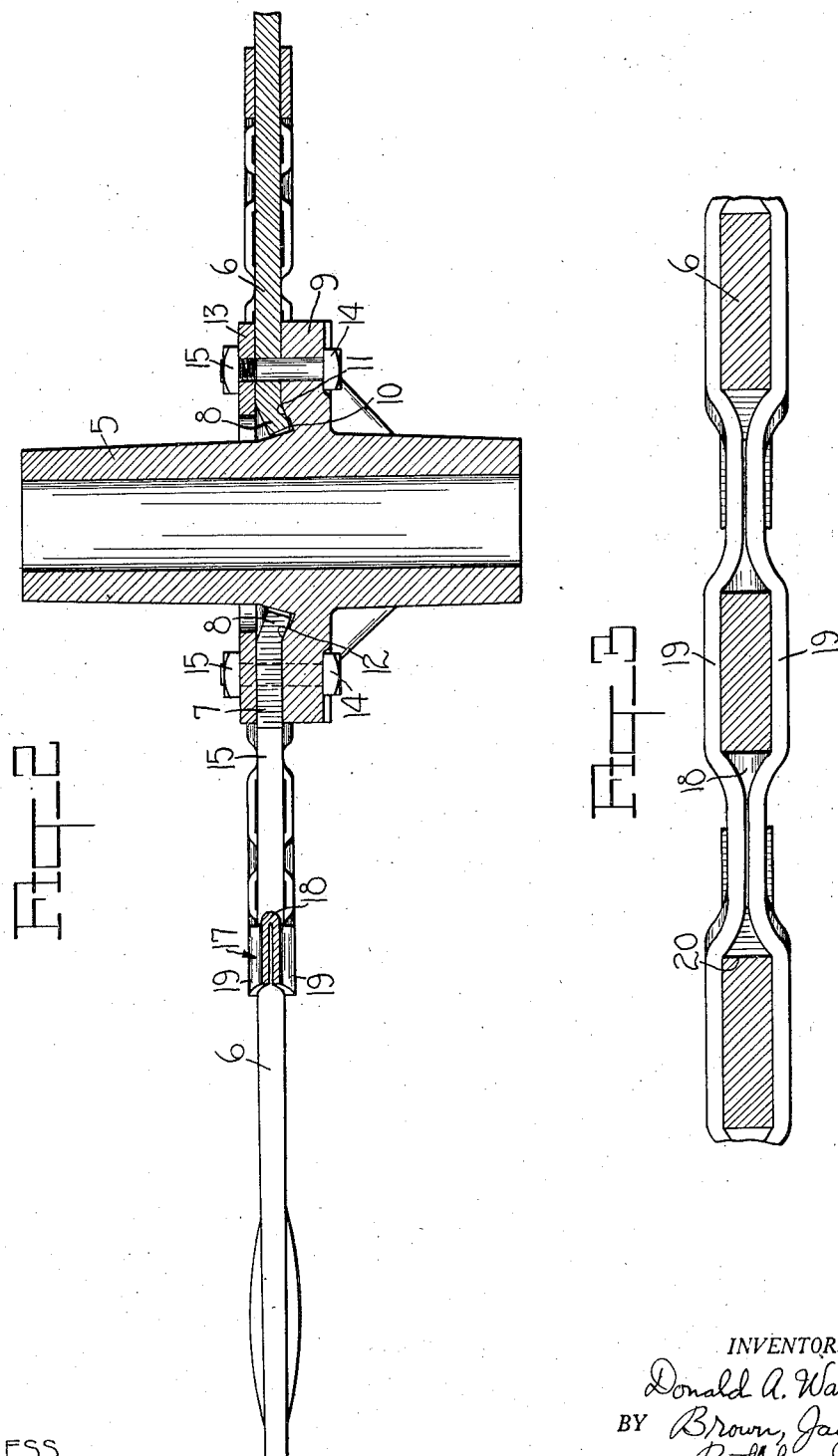
WITNESS.
Edward Melin
INVENTOR.
Donald A. Wangelin
BY Brown, Jackson
Boettcher + Dienner
ATTORNEY.

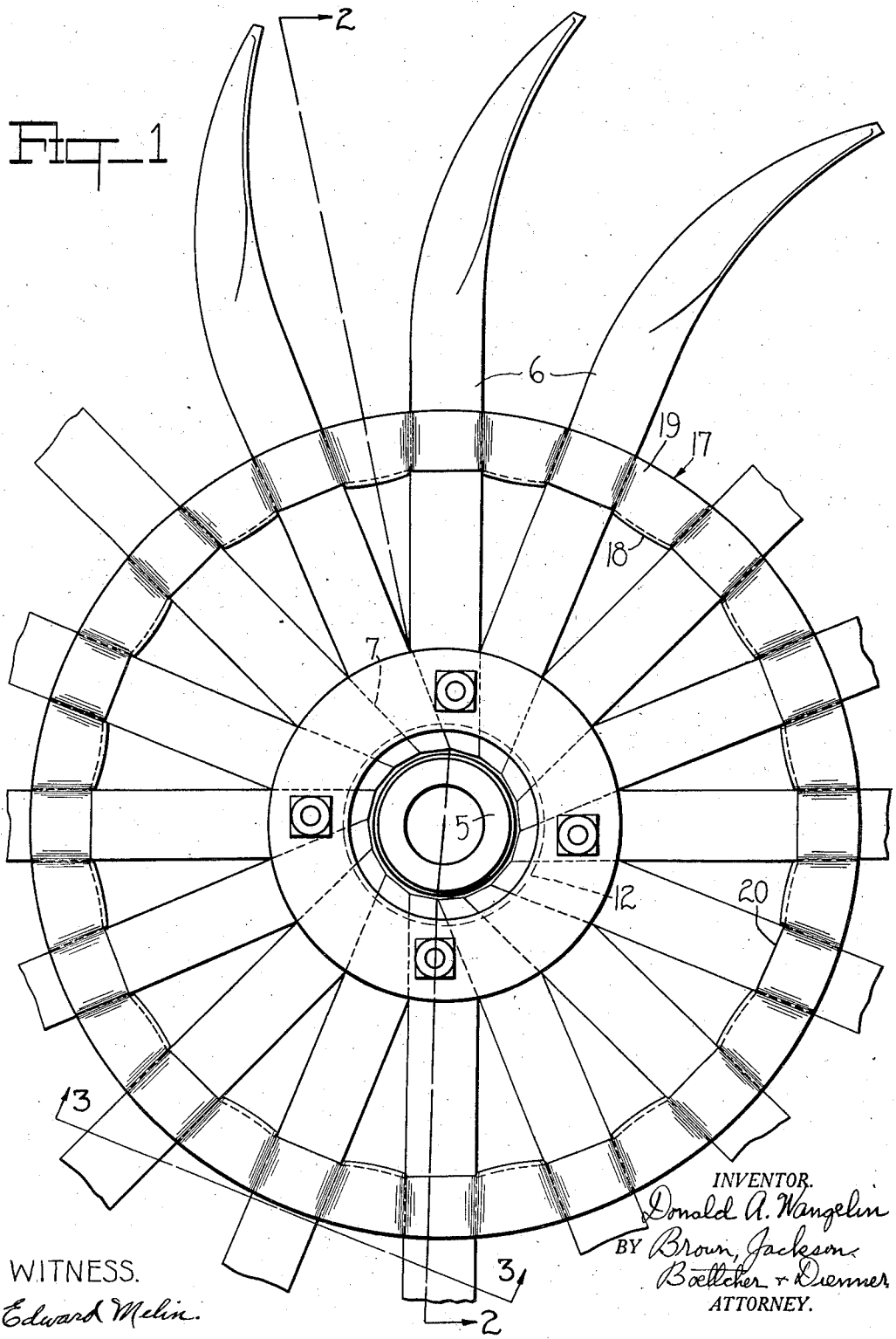

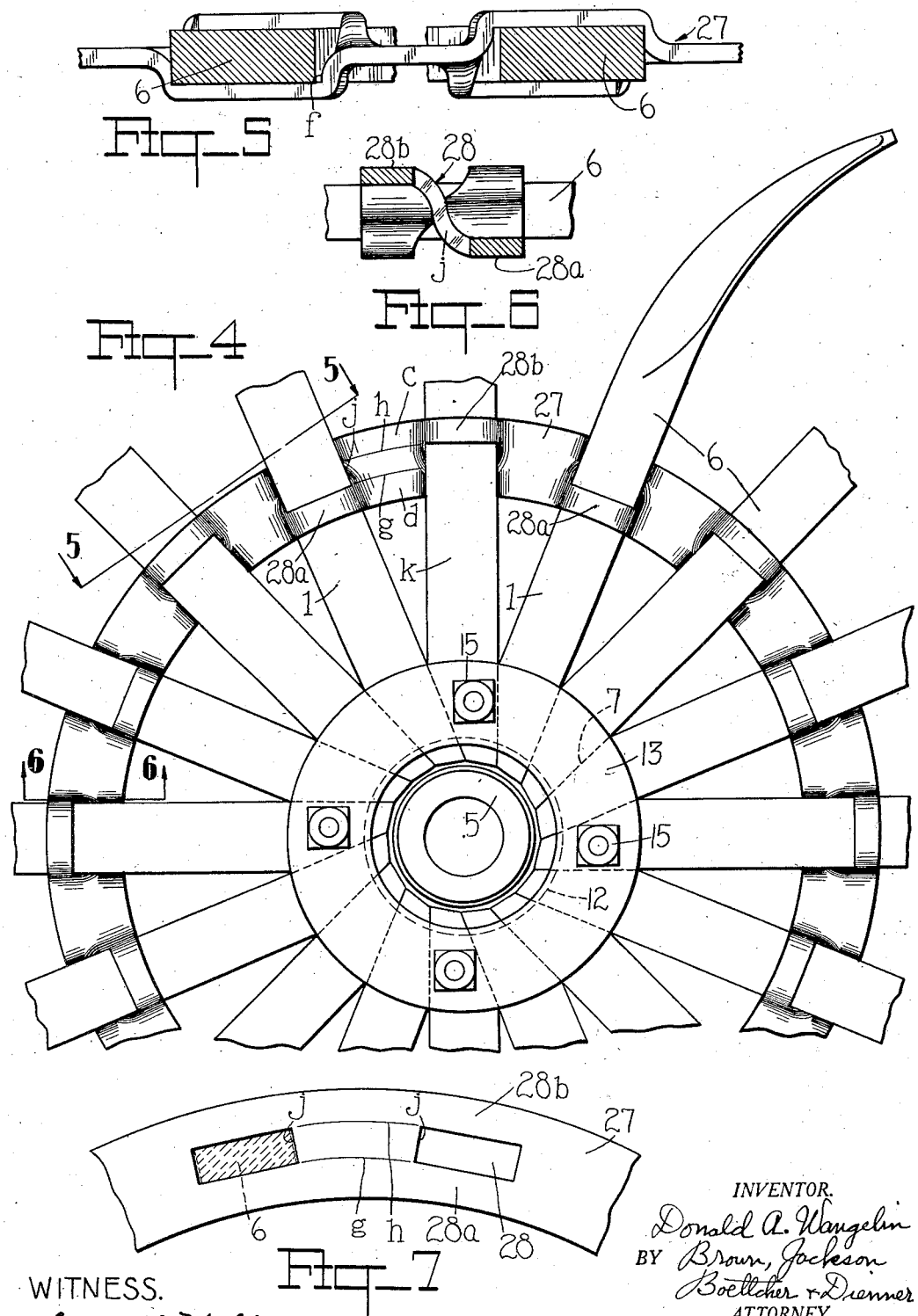

Patented Jan. 21, 1936

2,028,365

UNITED STATES PATENT OFFICE 2,028,365

ROTARY HOE

Donald A. Wangelin, Rock Island, Ill., assignor to Deere & Company, Moline, Ill., a corporation of Illinois Application February 3, 1932, Serial No. 590,549

21 Claims. (Cl. 55—24)

The present invention relates generally to improvements in cultivating implements, commonly known as rotary hoes, and is particularly concerned with a new and improved construction of the hoe wheels with which such implements are equipped. As is well known, these hoe wheels are arranged for rotation and each wheel comprises a hub member provided with radially outwardly extending teeth or spokes adapted to enter the soil in the forward rolling motion of the wheels over the ground. Usually the wheels are mounted side by side upon a common transversely extending shaft.

The present invention is specifically directed to a type of hoe wheel which is provided with steel teeth. One object of the present invention is to provide such a hoe wheel in which the teeth are rigidly and securely attached to the hub member and are reinforced and strengthened against circumferential and lateral stresses.

Generally the teeth of hoe wheels of the type above referred to are disposed in coplanar radial relation with the inner ends nested with contiguous edges in abutting relation and secured to the hub. The present invention contemplates so forming the ends of the radial teeth and the hub that when the teeth are secured to the hub each tooth or spoke is drawn radially inwardly a slight amount, thereby firmly wedging the teeth in position.

Another object of the present invention of primary importance is the position of means disposed intermediate the ends of the teeth for strengthening them against lateral stresses as well as maintaining the teeth in their proper radial position. Specifically, the present invention contemplates the provision of a ring member having a plurality of apertures or slots through which the teeth extend, the ring member being crimped or otherwise deformed to lie about each tooth or spoke so as to firmly engage each tooth on all sides thereof, particularly the edges. Briefly, the present invention embraces the feature of providing a ring member which when crimped, deformed, or otherwise operated upon in the process of manufacturing the wheel, serves to forcibly and firmly engage each spoke or tooth to prevent the same from loosening and to reinforce and hold all of the teeth in proper position, both circumferentially and laterally of the wheel.

Still another object of the present invention is the provision of improved methods of manufacturing such wheels, particularly the method of securing the ends of the teeth to the hub member and of reinforcing the teeth and rigidly holding them in position.

Other objects and advantages of the present invention will be apparent to those skilled in the art after a consideration of the following detailed description of the preferred structural embodiment, taken in conjunction with the accompanying drawings, in which:

Fig. 1 is a side view of my improved hoe wheel, certain of the teeth or spokes being broken away;

Fig. 2 is a sectional view taken along the line 2—2 of Fig. 1;

Fig. 3 is an enlarged fragmentary sectional view taken along the line 3—3 of Fig. 1;

Fig. 4 is a fragmentary side view similar to Fig. 1 and illustrating a modified form of the reinforcing ring member engaging the teeth of the hoe wheel;

Fig. 5 is an enlarged sectional view taken along the line 5—5 of Fig. 4;

Fig. 6 is an enlarged fragmentary view taken along the line 6—6 of Fig. 4; and

Fig. 7 is a fragmentary view showing a portion of the slotted reinforcing ring before the marginal portions of the slots have been deformed to provide for the insertion of the teeth of the hoe wheel.

Referring now to the drawings, the reference numeral 5 indicates the hub member of the wheel which is in the form of a suitable casting. Extending outwardly radially from the hub member are a plurality of steel teeth 6, each tooth being suitably shaped at its outer end as is usual in hoe wheels. At its inner end each tooth is cut away or beveled, as indicated at 7, so that the teeth may be nested together in radial formation about a common center with the beveled or tapered portions 7 contiguously disposed in wedging contact. It is to be noted that only one edge of each tooth is beveled at the inner end of the tooth, the other edge being straight and forming a continuation of the body portion of the tooth. While this is the preferred construction, obviously both edges of the tooth may be beveled or tapered if desired. Where only one edge is beveled the contacting contiguous edges of the spokes do not extend in a true radial direction but this is not important since the inner ends of the teeth are, nevertheless, so tapered that radial inward movement of the teeth serves to tighten and wedge the inner ends of the latter in their proper radial position.

The innermost end of each tooth is bent in a lateral direction away from the plane of the tooth proper to form a laterally directed angular portion or lug 8, as best shown in Fig. 2. These angular portions 8 of the teeth, when the latter are assembled in proper radial position, lie substantially on the surface of a cone having an axis coinciding with the axis of the hub member 5. To accommodate these laterally disposed angular lugs 8 of the spokes or teeth 6, the hub member 5 is provided with a radial flange 9 having a circumferential recess 10 extending around the hub and opening laterally to provide a laterally directed shoulder 11. Preferably, the shoulder 11 forms an extension of the angular side wall of the recess which angles inwardly toward the axis of the hub 5 at an angle somewhat less than 45°. The shoulder 11, of course, extends circumferentially around the axis of the hub member and lies on a circle whose diameter is not greater, but preferably the same or slightly less, than the diameter of the circle 12 which, when the teeth are nested together, marks or contains the points on the teeth 6 where the bent portion of the angular lugs 8 start.

The purpose of this arrangement is to provide mutually cooperating means on the flange 9 and the teeth 6 so that when the teeth are clamped to the flange the angularly disposed portion 8 on each tooth contacts with the laterally directed shoulder 11 to set up a camming action which causes each tooth to be shifted inwardly towards the hub a slight amount, thereby wedging the inner ends of the teeth firmly in radial position with each tooth pressing against the adjacent tooth.

For securing and clamping the several teeth to the hub member I provide a flat ring or plate 13 which, when in position, rests against one side face of each of the several teeth and encircles the laterally extending angular lugs 8 at the inner ends of the teeth, as shown in Figs. 1, 2 and 4. Certain of the teeth 6, the flange 9 and the rings 13 are provided with registering openings to accommodate bolts 14 having nuts 15 thereon. When the nuts 15 are tightened the ring 13 is pressed against the inner ends of the spokes 6 thereby forcing the angular lugs 8 into the recess 10 and, at the same time, drawing the spokes 6 radially inwardly to wedge the tapered inner ends together and to clamp all of the spokes against the flange 9. Thus, not only are the inner ends of the spokes firmly clamped against the flange 9 but also the ends of the spokes are wedged against one another in edge-to-edge relationship, whereby an extremely sturdy wheel construction is achieved. It will be noted that in this construction not all of the spokes 6 have openings therethrough, only four being so formed, as indicated in Figs. 1 and 4. The majority of the teeth have no holes at all. It will also be noted that by the simple operation of tightening the ring 13 the spokes 6 are simultaneously clamped against the flange 9 of the hub member and against one another in firm rigid position.

For holding the outer ends of the several teeth 6 in fixed spaced relationship to each other and for reinforcing each of said teeth at a point intermediate its ends, I provide a ring member 17 of U-shaped cross section, see Figs. 1, 2 and 3. The U-shaped ring member 17 preferably takes the form of a channeled member having a base portion 18 and flanges 19 lying on opposite sides of the spokes 6 and extending radially outwardly from the base portion 18, see Figs. 1 and 2. In order to thus position the flanges on opposite sides of the spokes or teeth 6 the base portion 18 is provided with a plurality of apertures 20 to receive the teeth 6. Thus, the base portion 18 of the channeled ring member 17 is broken up into a plurality of interrupted sections, each section being disposed between and contacting with the adjacent edges of consecutive teeth. The member 17 of channeled or U-shaped cross section may be endless or it may be formed from a length of flat stock suitably shaped by means of dies with the ends thereof welded together to form a circular ring.

The operation of manufacturing the several parts of the illustrated hoe wheel and the method of assembling such parts and reinforcing them to form the complete wheel will now be described. Each steel tooth 6 of the wheel has its outer end shaped to the form shown in Figs. 1 and 2, and the inner end of each tooth is bent to form the angular lug 8, the bend beginning at the point 12, as hereinbefore referred to, the lug 8 extending laterally from the main body portion of the tooth as shown in Fig. 2. Next, one side edge of each tooth is tapered or beveled as shown in Fig. 1. The channeled or ring member 17 is then formed with its base portion and two flange portions, the base portion being suitably apertured and the flange portions being spaced apart and lying in parallel planes, the spacing of the flanges 19 being sufficient to permit the insertion of the teeth with their angularly bent ends 8 through the openings in the base portion 18 of the member 17. The inner ends of the teeth are next nested together with the angular lugs lying in the recess 10 and then the ring member 13 applied and bolted to the flange 9 to thereby rigidly secure the inner ends of all of the teeth to the hub member 5, drawing the teeth radially inwardly in wedging radial position. The wheel is then placed in a die to crimp or deform the material of the ring member 17 to firmly lock the spokes or teeth 6 in proper relative position.

This crimping or deforming operation is of particular importance. Referring now to Figs. 1 and 3 it will first be observed that as the flanges 19 are pressed toward one another the material thereof firmly engages both sides of all of the teeth and the material also engages the edges thereof to positively prevent any movement of any of the teeth toward or away from each other. Further, the material forming the base portion 18, sections of which lie between adjacent teeth, is firmly pressed against adjacent edges of adjacent spokes. Remembering that the base portion 18 is disposed radially inwardly with respect to the lateral flanges 17, it will be observed from Fig. 2 that as the portions of the ring member 17 are pressed together between the teeth the material forming the sections of the base portion between adjacent teeth is constrained to flow inwardly toward the axis of the wheel rather than outwardly. Since, however, the teeth 6 extend radially outwardly the distance between adjacent edges of consecutive teeth decreases inwardly so that as the sections of the base portion 18 are crimped these sections are forced into a space slightly smaller than before the crimping operation. As a result the ends of these sections are wedged tightly against the edges of the teeth so that there is no danger of the teeth ever becoming out of place. In addition, the flanges 19 which lie on opposite sides of the teeth 6 reinforce the teeth against lateral stresses.

Referring now to Figs. 4 to 7, inclusive, it will be observed that the ring member there shown as reinforcing these teeth 6 between the ends thereof is of slightly different formation. In these figures the reinforcing ring member is designated by the reference numeral 27 and from Fig. 6 it is seen that this member comprises a substantially flat ring or plate. This single ring or plate is first provided with a plurality of rectangular slots 28. Originally these slots 28 are of a length slightly in excess of the width of the teeth 6, as indicated in dotted lines in Fig. 7. The slots 28 are spaced around the ring member 27 to correspond with the distance between the teeth 6 at the points where the ring 27 is to be positioned. Next the marginal portions of the ring 27 between the outer and inner edges thereof and the slot are spread in opposite directions to accommodate the thickness of the teeth, that is, the radially inner marginal portion 28a, see Fig. 7, is spread or distorted out of the general plane of the ring in one direction while the radially outer marginal portion 28b is spread or distorted away from the plane of the ring 27 in the opposite direction, the spread being sufficient to permit the insertion of a tooth therebetween so that the tooth will lie in the general plane of the ring member 27, see Fig. 6. The material adjacent each slot is thus bent or deformed, preferably at the same time, and it will be noted from Fig. 4 that this operation is so performed that where the radially inner marginal portion 28a adjacent one slot is pressed in one direction away from the general plane of the ring 27 the corresponding marginal portions of adjacent slots are pressed in the opposite direction. This disposes the sections 28a and 28b in alternate or staggered relation so that the outer portion of the ring 27 lies first on one side and then on the other of the teeth 6 while the radially inner portion also lies first on one side and then on the other of the teeth 6 but in just the opposite manner, as will be hereinafter referred to.

In the fabrication of this wheel, first a blank ring with slots 28 is formed, then the portions of the ring between the edges of the slots and the edges of the ring are crimped in opposite directions. Next the teeth 6 are threaded through the slots and fixed to the hub 5 in the manner set forth above in connection with Figs. 1 to 3. The wheel is then placed in a die and the portion of the material between the slots 28 is flattened and the marginal portions 28a and 28b are pressed flat against the side faces of the teeth 6. This operation is one of considerable importance. Remembering, first, that the slots 28 were initially formed of a length slightly greater than the width of the teeth 6 it will be recognized that the initial formation of the laterally spread marginal portions 28a and 28b will serve to reduce the length of the slots 28 to a point where this length is practically equal to the width of a tooth. Then when the material between the teeth is flattened this causes the material at the ends of the marginal portions 28a and 28b to be forced tightly against the edges of the teeth, as indicated at e and f in Fig. 5. Further, this operation also serves to shorten the length of the slots 28 in which the teeth 6 are disposed so that the ends of these slots are forced tightly against the edges of the teeth. All of the teeth are thus rigidly held in fixed spaced relation and prevented from moving toward or away from each other in the plane of the wheel, principally by virtue of the band or strip of metal or other material of which the ring 27 may be formed between the lines g and h, see Fig. 4, the ends j of which are twisted in opposite directions, see Fig. 6, and bear directly against the edges of the teeth, this band of metal thus acting in compression while the marginal portions 28a and 28b embracing the teeth act in tension in firmly holding the ends j against the edges of the teeth 6. Actually, the ends j form the ends of the slots 28.

It should also be noted that the marginal portions of the ring 27, that is, the circular strips of metal c and d between the sides of the slots 28 and the inner and outer edges of the ring 27 outside the lines g and h and including the marginal portions 28a and 28b also act in tension in holding the teeth fixed in proper spaced relation.

Reference was made above to the fact that the marginal portions 28a and 28b opposite the slots 28 are disposed on opposite sides of the teeth passing through the slots. Also, these marginal portions 28a and 28b are staggered, thus bringing the strip of metal c on one side of the teeth k, see Fig. 4, and on the other side of the adjacent teeth l while the inner strip of metal d is disposed on the side of the tooth k opposite the strip c and on the same side of the adjacent teeth l. Each tooth is thus reinforced on one side at a different distance from the center of the wheel than it is on the other. Each tooth, therefore, is stronger against bending laterally of the wheel in one direction than it is in the other. That is, the tooth k is stronger against bending forwardly out of the plane of the paper toward the observer while the teeth l are stronger against bending rearwardly from the plane of the paper. However, where one tooth is stronger against bending in one lateral direction the tooth adjacent thereto is stronger against bending in the opposite direction and since at least two teeth are in the ground at the same time the wheel as a whole offers as much resistance to bending in one direction as it does in the opposite direction. There is, therefore, no tendency for the wheel to dish or otherwise become distorted.

With respect to maintaining the teeth 6 in proper spaced relation in the plane of the wheel it is important to observe that in both forms of reinforcing ring members, shown in Figs. 1 and 4, there are sections or struts forcibly held against adjacent edges of the teeth. In the form shown in Fig. 1, as previously explained, the sections of the base portion 18 are compressed or crimped so as to be extended or forced against adjacent edges of the hoe wheel teeth, while in the form shown in Fig. 4 the bands or struts between the lines g and h are held with their twisted ends j in firm engagement with the adjacent edges of the teeth by virtue of the tension imparted to the strips of material passing from one side to another of the teeth 6 in basket weave fashion.

While I have shown and described above the preferred structural embodiment, it is to be understood that my invention is not to be limited to the specific structure shown and described but that, in fact, widely different means may be employed in the practice of the broader aspects of my invention as defined in the appended claims.

What I claim, therefore, and desire to secure by Letters Patent is:

1. A hoe wheel comprising a hub member, a plurality of teeth radiating from said hub member and adapted to be forced into wedging relation when shifted radially inwardly, the inner ends of the teeth having an oblique bend, said hub member being provided with means against which the obliquely bent ends of said teeth are received, and means cooperating with the teeth for clamping them to the hub member with the bent ends reacting against said first named means to force said teeth radially inwardly.

2. A hoe wheel comprising a hub member, a plurality of teeth radiating from said hub member and adapted to be forced into wedging relation when shifted radially inwardly, the inner end of said teeth and said hub member having mutually cooperating means acting to draw each of the teeth radially inwardly when the latter are clamped to the hub member, and means for clamping the teeth to said hub member.

3. A hoe wheel comprising a hub member having a flange, a plurality of teeth radiating from said hub member in substantially co-planar relation, the adjacent edges of the teeth being in wedging contact and the inner ends of said teeth and said flange having mutually cooperating means serving to draw the teeth radially inwardly against one another when the teeth are tightened against the flange, and means for clamping the teeth to said flange.

4. A hoe wheel comprising a hub member provided with a radial flange, a circumferential recess having a laterally directed shoulder, a plurality of teeth radiating from the hub member in substantially co-planar relation, the adjacent edges of the teeth being in wedging contact and the inner end of each of the teeth being bent at an angle less than a right angle to the main body of the tooth, the points of bending defining a circle when the teeth are disposed in radial relationship which has a diameter greater than the diameter of said circumferential shoulder, and means for clamping all of the teeth to the flange of the hub member with the bent ends disposed in said recess whereby said bent ends and said shoulder mutually cooperate to draw said teeth radially inwardly as the teeth are tightened against said flange.

5. A hoe wheel comprising a hub member provided with a substantially flat lateral face and a laterally opening circumferential groove therein, a plurality of teeth radiating from said hub member, the inner ends of said teeth being bent to seat in said groove and each tooth abutting against said flat face and having at least one edge beveled to provide for nesting the teeth in radially assembled coplanar relation, and a member encircling the bent ends of the teeth and cooperating with the teeth and the hub member for clamping said teeth against said flat face with the bent ends of the teeth in said groove.

6. A hoe wheel comprising a hub member provided with a circumferential recess, a plurality of teeth radiating from said hub member, the inner ends of said teeth being bent at an angle to the major portion thereof, the inner ends of said teeth being tapered, and means for simultaneously clamping the inner angular portions of all of said teeth into the recess in the hub member, the angular portions of said teeth cooperating with a wall of said recess to thereby draw the tapered portions of said teeth into firm nested relation.

7. A hoe wheel comprising a hub member having a radial flange, a laterally directed shoulder on said flange, a plurality of teeth projecting radially from said hub member, the inner ends of said teeth being formed to lie substantially on the surface of a cone axially disposed with respect to the axis of said hub member, and means for clamping all of the teeth to the flange of the hub member with the inner ends disposed against said shoulder, the clamping of said teeth serving to draw said teeth radially inwardly into firm nested relation.

8. A hoe wheel comprising a hub member, a plurality of teeth having their inner ends secured to the hub member, and a U-shaped ring member reinforcing said teeth at points intermediate the ends thereof, said U-shaped ring member having a base portion disposed between adjacent edges of adjacent teeth with openings through which the teeth extend and flange portions extending radially outwardly from the base portion and lying on opposite sides of said teeth, said flanges and base portion of the ring member being crimped about said teeth whereby the latter are rigidly connected together.

9. A hoe wheel comprising a hub member, a plurality of teeth having their inner ends secured thereto and extending radially outwardly therefrom, and a ring member reinforcing said teeth at points intermediate the ends thereof, said ring member comprising a flat plate having slots embracing the teeth and crimped about the teeth to rigidly connect them together.

10. A hoe wheel comprising a hub member, a plurality of teeth having their inner ends secured thereto, and a ring member for reinforcing the teeth at points intermediate the ends thereof, said ring member comprising a flat plate having slots through which the teeth extend with the radially inner and outer marginal portions of said slots crimped in alternate relation about said teeth to rigidly connect the latter together.

11. A hoe wheel comprising a hub member provided with a substantially flat lateral face, a plurality of teeth radiating from said hub member, the inner ends of said teeth being tapered to provide for nesting the teeth in radially assembled coplanar relation, means for clamping the teeth to said hub member, and cooperating means on the teeth and hub member acting to draw each of the teeth radially inwardly when the latter are clamped to the hub member.

12. A hoe wheel comprising a hub member, a plurality of teeth radiating therefrom and secured thereto, and a reenforcing ring member of substantially U-shaped cross section mounted on said teeth with the base portion of said U-shaped member disposed radially inwardly with respect to said teeth, said ring member having openings suitably spaced apart in the base portion thereof for receiving said teeth, and the material of the ring member adjacent the openings therein being in a state of stress which causes the base portions of the ring member between the openings to bear tightly against the adjacent portions of the teeth.

13. A hoe wheel comprising a hub member, a plurality of teeth radiating therefrom and secured thereto, and a reenforcing ring member comprising a generally flat plate with slots therein to receive said teeth, the marginal portions of said slots extending alternately on opposite sides of the teeth and firmly engaging the opposite edges of the teeth.

14. A hoe wheel comprising a hub member, a plurality of teeth radiating therefrom and secured thereto, and a reenforcing ring member formed of originally flat stock and provided with slots therein suitably spaced to receive said teeth, the radially inner marginal portions of said slots being alternately displaced in opposite directions from the plane of the ring member and the radially outer marginal portions of said slots being alternately displaced in opposite directions from the plane of said ring member and in staggered relation with respect to said radially inner marginal portions of the slots, whereby said teeth may be disposed in said slots and lie substantially in a common plane, the radially inner portions of the ring member lying first on one side of one tooth and then on the other side of the adjacent tooth and the radially outer portion of said ring member lying first on one side of a tooth and then on the other side in opposite relation with respect to said radially inner portions, the portions of said reenforcing ring member between said teeth being biased to force the end walls of said slots against the edges of the teeth and to lock the latter in firm relation with said member and to reenforce alternate teeth against lateral bending in opposite directions.

15. A hoe wheel comprising a hub member, a plurality of teeth secured thereto and projecting radially outward therefrom, and reenforcing means for said teeth comprising a flat ring member disposed in a plane adjacent the common plane of said teeth and having slotted portions pressed out of the plane of said ring member to receive said teeth.

16. A hoe wheel comprising a hub member, a plurality of teeth radiating therefrom and secured thereto, and a reenforcing ring member of substantially U-shaped cross section mounted on said teeth with the base portion of said U-shaped member disposed radially inwardly with respect to said teeth, said ring member having openings suitably spaced apart in the base portion thereof for receiving said teeth, sections of said base portion between the spokes being spaced apart appreciably less than the thickness of the spokes and bearing against the adjacent portions of the teeth.

17. A hoe wheel comprising a hub member provided with a substantially flat lateral face, a plurality of teeth radiating from said hub member, the inner ends of said teeth being tapered to provide for nesting the teeth in edgewise contact, a ring member for clamping the teeth to said hub member, and cooperating means on the teeth and on one of said members for drawing each of the teeth radially inwardly when the latter are clamped to the hub member.

18. A hoe wheel comprising a hub member, a plurality of teeth radiating from said hub member in substantially coplanar relationship, the adjacent edges of the teeth being in wedging contact, means including a ring member for clamping the teeth to said hub member, cooperating means on the inner ends of said teeth and the ring member serving to draw each of the teeth radially inwardly when the latter are clamped to the hub member by said ring member, and a reenforcing ring member disposed radially outwardly of the hub member and including portions embracing said teeth and sections stressed so as to cause portions of said reenforcing ring member to be firmly clamped against the edges of said teeth.

19. A hoe wheel comprising a hub member, a plurality of teeth having their inner ends secured thereto and extending radially outwardly therefrom, and ring means reenforcing said teeth at points intermediate the ends thereof, said ring means comprising flat radially inner and outer portions embracing the teeth alternately on opposite sides thereof and crimped about the teeth to rigidly connect them together.

20. A hoe wheel comprising a hub member, a plurality of teeth radiating therefrom and secured thereto, and reenforcing means comprising generally flat ring-like portions spaced apart radially to receive said teeth therebetween, the radially inner ring-like portion being alternately displaced in opposite directions from the general plane of the teeth and the radially outer ring-like portion being alternately displaced in opposite directions from the general plane of said teeth and in staggered relation with respect to said radially inner ring portion, the radially inner ring portion lying first on one side of one tooth and then on the other side of the adjacent tooth and the radially outer ring portion lying first on one side of a tooth and then on the other side, in opposite relation with respect to said radially inner ring portion.

21. A hoe wheel comprising a hub member, a plurality of teeth radiating from said hub member in substantially coplanar relationship and arranged to be nested together in wedging engagement when shifted radially inwardly, means including a ring member for clamping the teeth to said hub member, cooperating means on the inner ends of said teeth and one of said members serving to apply a generally radially inwardly directed force to each of the teeth to force them radially inwardly into their nested relation when they are clamped to the hub member by said ring member, and a reenforcing ring member disposed radially outwardly of the hub member and including portions embracing said teeth and sections stressed so that portions of said reenforcing ring member are forced laterally against the edges of said teeth after the latter have been forced radially inwardly into their nested relation by said hub and ring members, whereby said reenforcing ring member cooperates with said clamping ring member in maintaining said teeth in their radially inward position on the hub member.

DONALD A. WANGELIN.